United States Patent
Anderson et al.

(10) Patent No.: US 10,593,119 B2
(45) Date of Patent: Mar. 17, 2020

(54) PROJECTED AUGMENTED REALITY TO OBSCURE PHYSICAL OBJECTS

(71) Applicant: Intel Corporation, Santa Clara, CA (US)

(72) Inventors: Glen J. Anderson, Beaverton, OR (US); Carl Marshall, Portland, OR (US); Ankur Agrawal, Portland, OR (US); Meng Shi, Hillsboro, OR (US); Selvakumar Panneer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/017,685

(22) Filed: Jun. 25, 2018

(65) Prior Publication Data

US 2019/0043262 A1 Feb. 7, 2019

(51) Int. Cl.
| | | |
|---|---|---|
| *G06T 19/00* | (2011.01) | |
| *G02B 27/02* | (2006.01) | |
| *G06T 7/70* | (2017.01) | |
| *G02B 27/01* | (2006.01) | |
| *G06T 7/90* | (2017.01) | |

(52) U.S. Cl.
CPC ........ *G06T 19/006* (2013.01); *G02B 27/0172* (2013.01); *G02B 27/024* (2013.01); *G06T 7/70* (2017.01); *G06T 7/90* (2017.01); *G02B 2027/0138* (2013.01)

(58) Field of Classification Search
None
See application file for complete search history.

(56) References Cited

U.S. PATENT DOCUMENTS

2005/0286129 A1* 12/2005 Huber .................. A63J 5/02
                                                      359/490.02
2011/0202492 A1*  8/2011 Salemann ............ G06F 16/29
                                                      706/50

(Continued)

FOREIGN PATENT DOCUMENTS

JP        2002247602 A       8/2002

OTHER PUBLICATIONS

Oliver Bimber et al., "The Virtual Showcase as a new Platform for Augmented Reality Digital Storytelling", May 22-23, 2003, 9 pages.

(Continued)

*Primary Examiner* — Jwalant Amin
(74) *Attorney, Agent, or Firm* — Schwabe, Williamson & Wyatt, P.C.

(57) ABSTRACT

The present disclosure is directed to systems, apparatuses, and processes that provide mixed reality and/or augmented reality interactive environments. Disclosed embodiments include mechanisms to determine a location of a physical object within a mixed reality environment, determine a location of a viewer within the mixed reality environment, and project a display onto the physical object or on a portion of an area within the mixed reality environment proximate to the physical object to obscure the physical object from the viewer, based upon at least the location of the physical object with respect to the location of the viewer. Other embodiments may be disclosed and/or claimed.

24 Claims, 6 Drawing Sheets

(56) References Cited

U.S. PATENT DOCUMENTS

| | | | |
|---|---|---|---|
| 2013/0093788 A1* | 4/2013 | Liu | G06F 3/011 |
| | | | 345/633 |
| 2016/0379412 A1* | 12/2016 | Butler | G06T 19/006 |
| | | | 345/633 |
| 2017/0358096 A1* | 12/2017 | Boss | G06K 9/00671 |
| 2017/0358142 A1 | 12/2017 | Lee et al. | |
| 2018/0003966 A1* | 1/2018 | Kilcher | G02B 5/208 |

OTHER PUBLICATIONS

Masahiko Inami et al., "Optical Camouflage Using Retro-reflective Projection Technology", Oct. 2003, 2 pages, IEE Computer Society, Proceedings of the Second IEEE and ACM International Symposium on Mixed and Augmented Reality (ISMAR'03).

"Image-Space Illumination for Augmented Reality in Dynamic Environments", Sep. 2014, 10 pages.

"Lightform" Mar. 27, 2017, 7 pages, https://lighfform.com/.

* cited by examiner

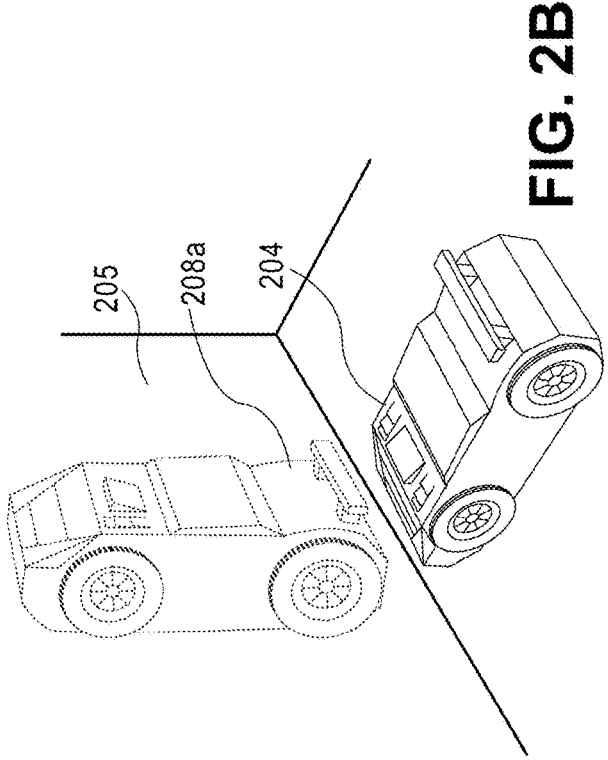
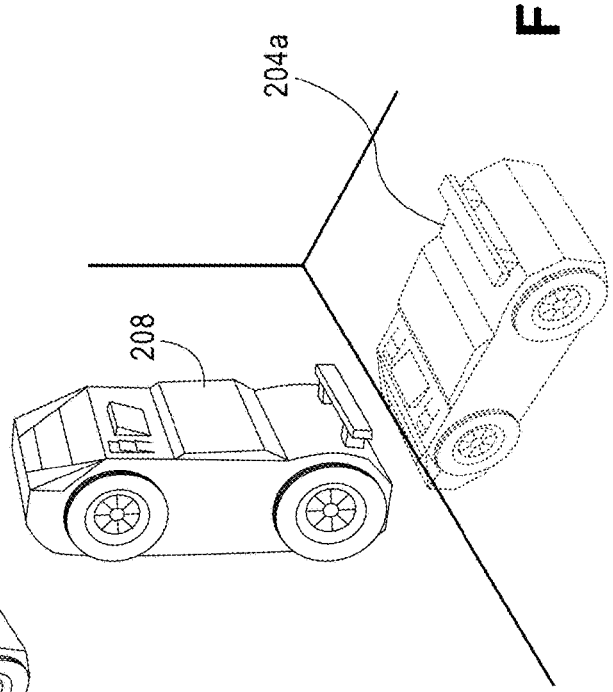
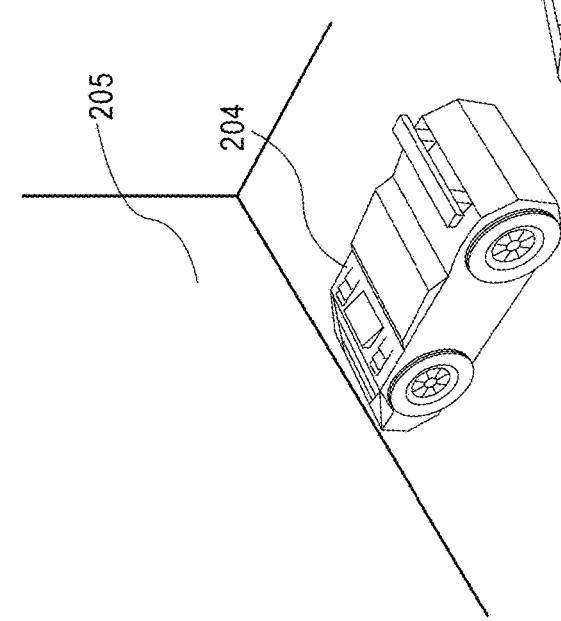
FIG. 2A
FIG. 2B
FIG. 2C

NON-TRANSITORY COMPUTER-READABLE STORAGE MEDIUM
602
AS MAY BE IMPLEMENTED IN EMBODIMENTS OF FIG. 5

PROGRAMMING INSTRUCTIONS
604
TO CAUSE A DIGITAL CONTENT CONSUMPTION DEVICE, IN RESPONSE TO EXECUTION OF THE INSTRUCTIONS BY A PROCESSOR OF THE DIGITAL CONTENT CONSUMPTION DEVICE, TO PRACTICE ASPECTS OF EMBODIMENTS OF THE PROCESSES OF FIGS. 1-5.

PROJECTED AUGMENTED REALITY TO OBSCURE PHYSICAL OBJECTS

FIELD

Embodiments of the present disclosure generally relate to the field of augmented reality (AR). More specifically, embodiments of the present disclosure relate to obscuring and unobscuring physical objects in an AR/mixed reality environment.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

AR may include a direct or indirect live view of a physical, real-world environment with elements that may be "augmented" by computer-generated perceptual information. This may occur across multiple sensory modalities, including visual, auditory, haptic, somatosensory, olfactory, and the like. This type of environment may also be referred to as a mixed reality environment.

AR may bring components of the digital world into AR user's perception of the real world through the integration of immersive sensations that are perceived as natural parts of an environment. For example, AR may track objects across both the real-world and virtual representations in a mixed reality environment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 2A-2C illustrates aspects of a vehicle object at various stages within a mixed reality environment using projection, in accordance with various embodiments.

DETAILED DESCRIPTION

Figure 1:
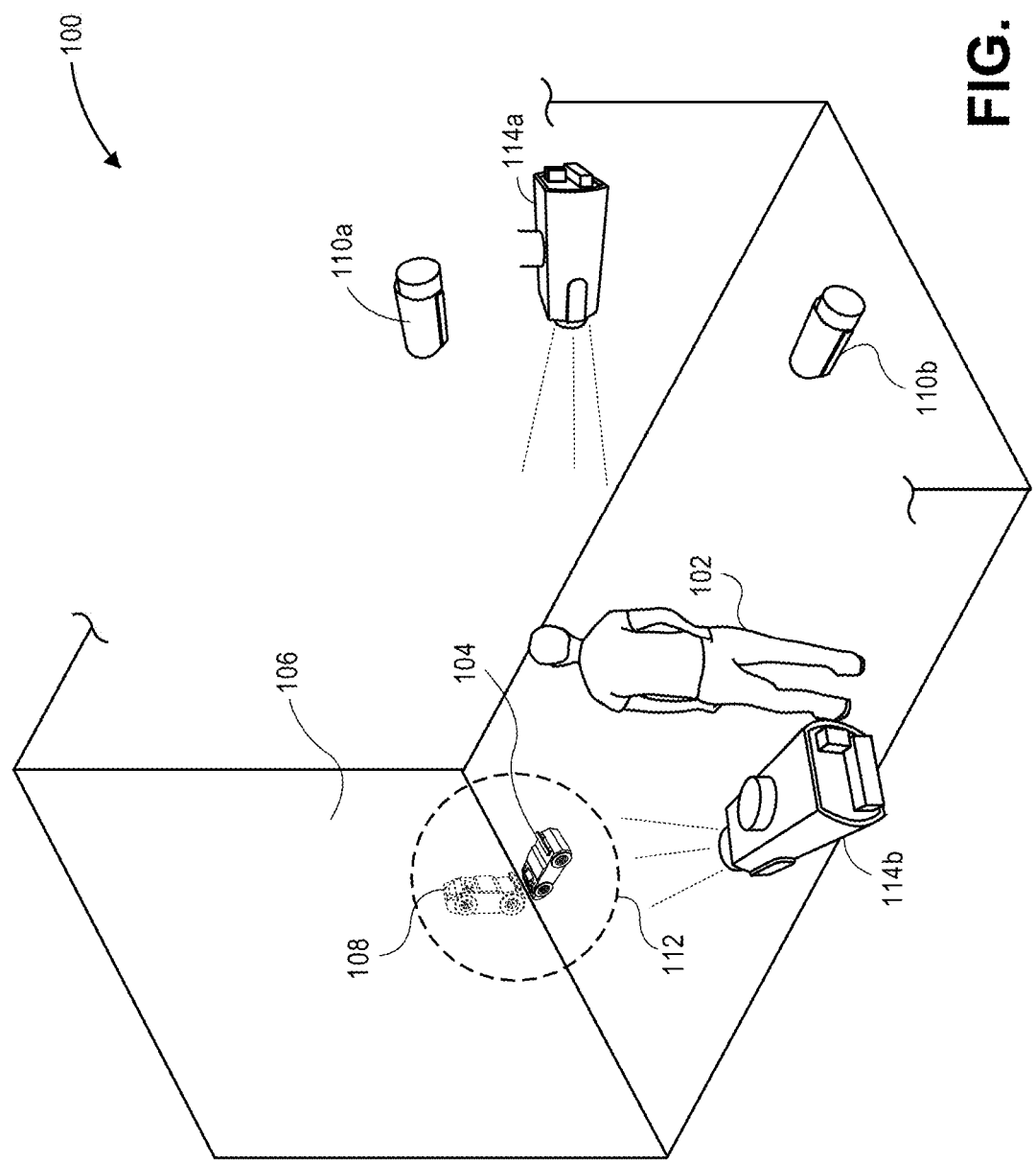
FIG. 1 is context diagram of a mixed reality environment that includes a user, in accordance with various embodiments.

This disclosure may include systems, processes, and apparatuses for enhancing the user experience in a mixed reality (which may also be referred to as an AR) environment. Embodiments may include obscuring or hiding a physical object from view when the physical object has passed into a digital representation within the mixed reality environment. Embodiments may include unobscuring a physical object from view when the physical object has passed from a digital representation into the physical environment within the mixed reality environment. In embodiments, the physical object may be any physical object or one or more physical objects that interact with a mixed reality environment and/or have virtual (or digital) representations in a mixed reality environment.

In legacy implementations, objects may be tracked across real and virtual representations in a mixed reality environment. For example, a golf ball may be driven towards a display within a mixed reality environment. The display may identify the ball, and based upon the interaction of the ball with the display, create a virtual image of the ball that will appear to continue into the screen, for example to appear as if it is traveling down a fairway or rolling onto a green. In this example, the physical golf ball may stop at the display and then drop to the ground below the display.

In other examples, a digital image of a ball on a screen may appear to travel towards the display and when it appears to be leaving the display, focus may shift to a physical ball in the environment for the user to interact with physically. The ball may be laying in the environment, for example on the floor below the display, or the ball may be ejected by an actuator adjacent to the screen and roll onto a mat in front of the screen.

In embodiments described herein, the physical golf ball as described in the above example may be obscured during a portion of the time the golf ball is represented digitally in the mixed reality environment, and may be unobscured when the golf ball ceases to be represented digitally in the mixed reality environment. The obscuring of the golf ball may include various forms of light to be projected onto the golf ball or onto an area surrounding the golf ball so that from a view of a golfer or of some other viewer in the area, the physical golf ball may appear to be obscured. In embodiments, this may heighten the emphasis of the golf ball in the virtual environment.

In embodiments, as the ball continues to roll, projections onto ball may change to continue to obscure the ball as it comes to a stop. In other embodiments, rather than obscuring the ball (or other object), projections onto the ball may cause the ball to appear as another object. For example, as the struck golf ball enters the virtual environment, the physical golf ball may appear to be a turtle or a rock. In embodiments, the turtle may appear to be stationary or may appear to have some movement (for example a subtle movement of a neck or head.)

Embodiments described herein may include a system, apparatus, or process to determine a location of a physical object within a mixed reality environment, determine a location of a viewer within the mixed reality environment, and project a display onto the physical object or on a portion of an area within the mixed reality environment proximate to the physical object to obscure the physical object from the viewer, based upon at least the location of the physical object with respect to the location of the viewer.

Embodiments described herein may also further determine attributes, respectively, of a plurality of regions on the physical object, determine attributes, respectively, of a plurality of regions of a portion of the mixed reality environment proximate to the physical object. To project a display on the physical object may include modifying lighting projected onto the physical object based on the determined respective attributes of one or more of regions on the physical object or based on the respective attributes of one or more regions of the portion of the area within the mixed reality environment proximate to the physical object.

Modifying lighting on the physical object may include projecting, by a light source within the mixed reality environment, one or more types of light onto one or more of the plurality of regions on the physical object or at least one or more of the plurality of regions of the portion of the area within the mixed reality environment proximate to the physical object.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The term "computer-readable storage media" may refer to, be a part of, or otherwise include media on which data, including instructions of a module that may be executed, may reside. Computer-readable storage media may be either transitory, or non-transitory.

Various operations may be described herein as multiple discrete operations in turn, in a manner that is most helpful in understanding the claimed subject matter. However, the order of description should not be construed as to imply that these operations are necessarily order dependent.

FIG. 1 is context diagram of a mixed reality environment that includes a user, in accordance with various embodiments. Diagram 100 shows a mixed reality environment in which a user 102 interacts with a physical object 104. The mixed reality environment 100 includes a display screen 106 that shows the user 102 a digital portion of the mixed reality environment 100. As an example of an interaction, the user 102 may roll the physical object 104, for example a toy car, toward the display screen 106. In embodiments, sensors (not shown by FIG. 1) that are communicatively coupled with the display screen 106 sense or otherwise identify the physical object 104 rolling into the display screen 106. In embodiments, the sensors may be proximate to the display screen 106 and may communicate with the display screen 106 via a wired or wireless connection. In other embodiments, the sensors may be built into the display screen 106. In embodiments, this sensing or identification may cause the mixed reality environment to produce a digital image 108 of the physical object 104 for display on the display screen 106. In embodiments, the digital image 108 of the physical object 104 may continue to move within a virtual environment shown on the screen 106, for example to move up the screen 106. In embodiments, this may be described as the physical object 104 entering the virtual environment as virtual object 108.

Once the physical object 104 has entered the virtual environment as virtual object 108, the mixed reality experience of the user 102 is enhanced by obscuring the presence of the physical object 104 within the mixed reality environment 100. In embodiments, cameras 110a, 110b, are used to identify the physical object 104 to be obscured. In various embodiments, the cameras 110a, 110b are also be used to identify attributes of the physical object 104, for example but not limited to color of the object 104, shape of various regions or sections of the object 104, size of various regions or portions of the object 104, an amount of reflectivity of various regions/sections/portions of the object 104, and/or the like. In embodiments, the cameras 110a, 110b may be used to determine attributes of the physical object 104 from the perspective of the user 102. In embodiments, the cameras 110a, 110b may be mounted on walls, poles, or other hardware (not shown in FIG. 1) of the mixed reality environment 100. In embodiments, the cameras 110a, 110b may be mobile, such as on tracks, suspended from the ceiling, attached to a drone, and the like (not shown in FIG. 1). In embodiments, attributes of the physical object 104 may be obtained from other places, such as from the physical object 104 itself that may contain sensors or other instrumentation, or otherwise may include embedded communication circuitry to communicate attributes. In embodiments, attributes of the physical object 104 may be found in a storage device such as storage device 506 of the computing device 500 of FIG. 5 that supports a mixed reality environment 100 of FIG. 1.

In addition, the cameras 110a, 110b, may identify attributes of an area 112 around the physical object 104. These attributes may include color, shape of various regions, size of various regions, reflectivity of various regions, and the like of the area 112 around the physical object 104. In embodiments, this may be facilitated by using the one or more cameras 110a, 110b in the mixed reality environment 100. In embodiments, there may be a camera (not shown) mounted on the user's head.

In embodiments, projectors 114a, 114b may be used to project a display onto the physical object 104 to obscure it from the user 102. Projectors 114a, 114b may modify lighting projected onto the physical object 104 based upon the attributes of the physical object 104 and the attributes of the area 112 around the physical object 104. The projectors 114a, 114b may be able to project different attributes of light, for example but not limited to colors and intensities of light, onto various portions of the physical object 104 and/or area 112 around the physical object 104 to cause the physical object 104 to blend into the area 112, or otherwise to be obscured from the user 102.

Figure 5:
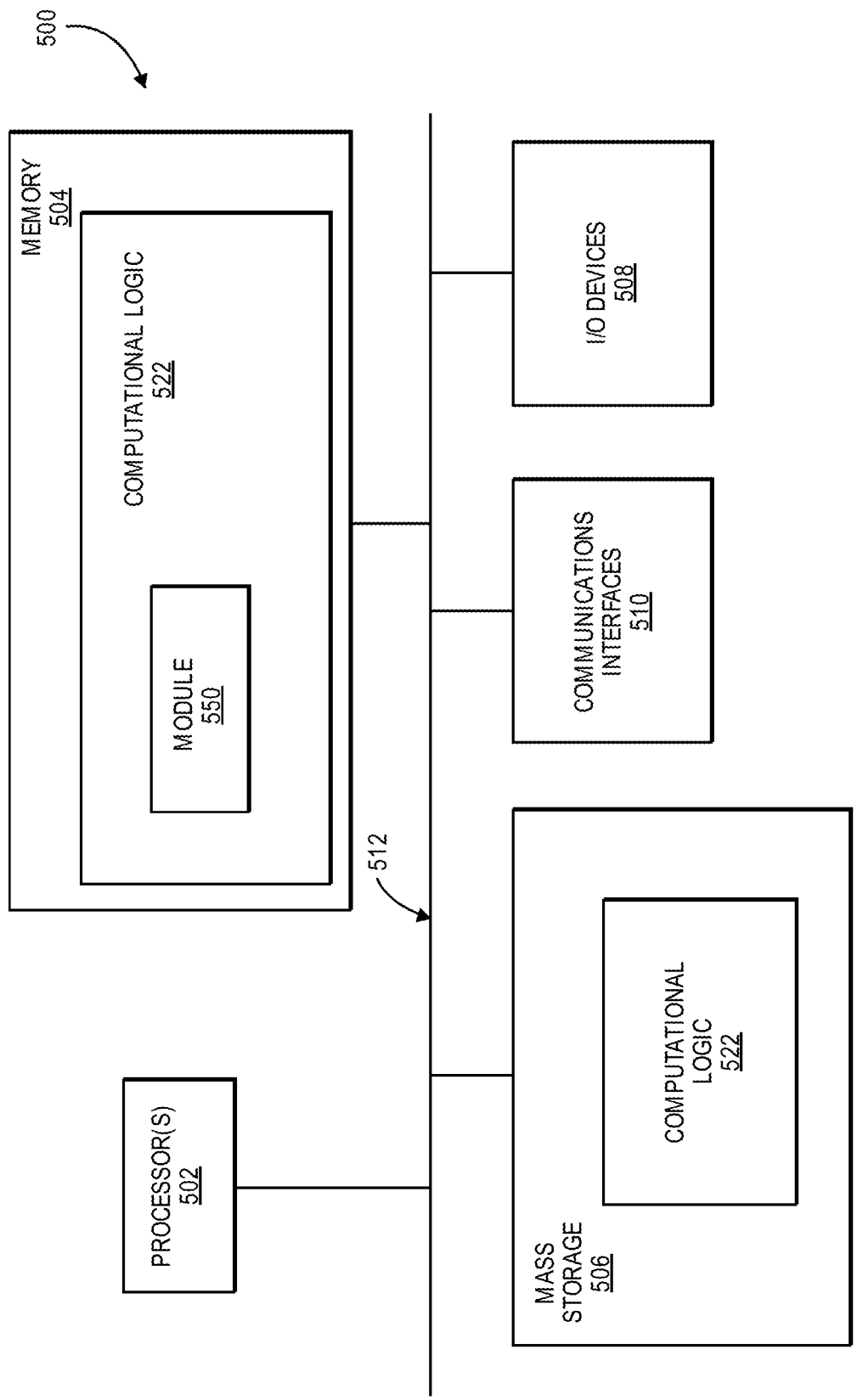
FIG. 5 illustrates an example computing device suitable for use to practice aspects of the present disclosure, in accordance with various embodiments.

In embodiments, the projectors 114a, 114b and/or the cameras 110a, 110b, may be coupled with an object obscuring module 550 of FIG. 5.

FIGS. 2A-2C illustrates aspects of a vehicle object at various stages within a mixed reality environment using projection, in accordance with various embodiments. FIG. 2A shows a physical object 204, which may be similar to physical object 104 of FIG. 1, that has rolled up to and come into contact with a wall 205. In embodiments, the wall 205 may be similar to the display screen 106 of FIG. 1, or the wall 205 may be a surface or object that may trigger some virtual object to be projected. In embodiments, the virtual object 208a, which may be similar to virtual object 108 of FIG. 1, may be projected using holographic imagery projected adjacent to the wall 205, or the virtual object 208a may be projected onto the surface of the wall 205 using conventional projection as part of the mixed reality environment 100.

In FIG. 2B, a virtual object 208a may begin appear on the wall 205. In embodiments, this may represent the physical object 204 entering into a virtual world of the mixed reality environment 100.

In FIG. 2C, the virtual object 208 may be fully viewable and engaged as a virtual object in the mixed reality environment. The obscured physical object 204a may be showed as obscured by lighting projected from projectors 114a, 114b of FIG. 1. Even though it may be only partially obscured, the obscured physical object 204a nevertheless may lessen a distraction from the virtual object 208 engaging in the mixed reality environment. In embodiments, when the physical object 204 passes into the virtual object 208, or vice versa, other output modalities may be experienced, for example haptics, sound, or chemical (e.g. olfactory) modalities. For example, the physical object 204 may be an object on a user 102 of FIG. 1, and when obscured, the mixed reality environment 100 may cause the physical object 204 to produce haptic output so that the user 102 feels movement. In embodiments, an audio from an audio output device (not shown) may produce a sound. Or in other embodiments, chemicals may be released to produce scents to indicate the transition of the physical object 204 to a virtual object 208, or vice versa.

Figure 3B:
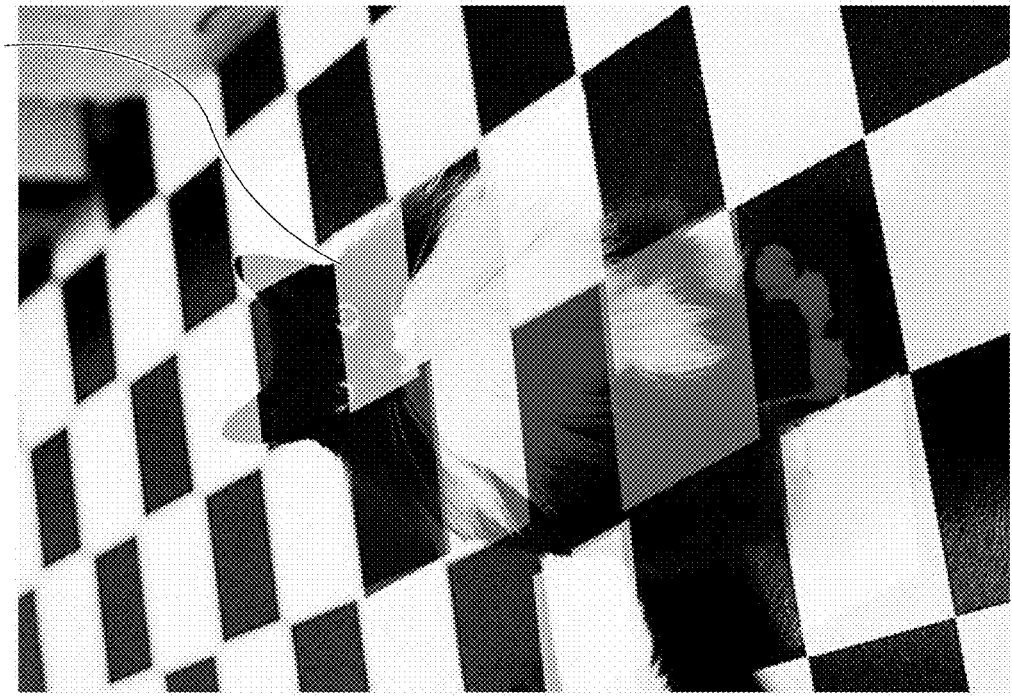
FIGS. 3A-3B illustrate another aspect of obscuring an object, in accordance with various embodiments.
Figure 3A:
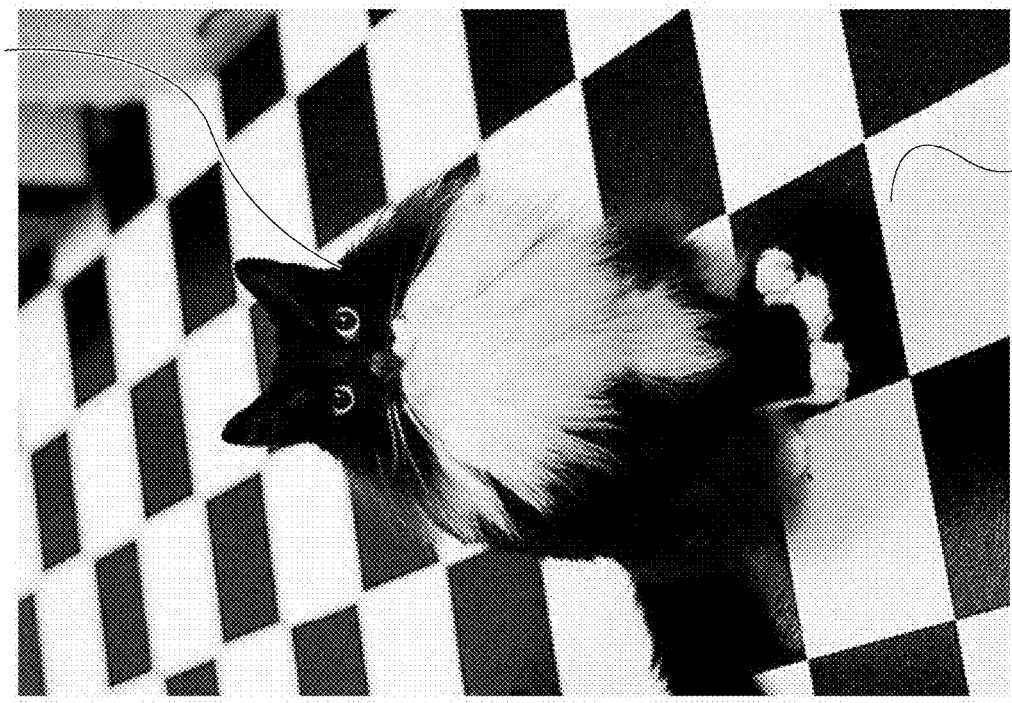

FIGS. 3A-3B illustrate another aspect of obscuring an object, in accordance with various embodiments. In FIG. 3A, a cat 304, which may be similar to physical object 202 of FIG. 2A, may be sitting on a floor in an area 312 surrounding the cat 304. In embodiments, a mixed reality system, implemented by computing device 500 of FIG. 5, may be to move the cat 304 into a virtual implementation of a cat (not shown) in mixed reality environment, which may be similar to mixed reality environment 100 of FIG. 1. After the virtual implementation of the cat 304 is complete, the cat 304 may be obscured as shown in FIG. 3B.

The mixed reality system may use cameras, which may be similar to cameras 110a, 110b of FIG. 1, to capture attributes of the cat 304 as well as attributes of the area 312, which may be similar to area 112 of FIG. 1 surrounding the cat 304. For example, attributes of the cat 304 may include its location, regions having different color of fur and reflectivity of fur. Attributes of the area 312 may include color, shape, and reflectivity of regions of the area 312. Additional information that may be used includes the location of the user/viewer (not shown by FIGS. 3A, 3B), which may be similar to user 102 of FIG. 1. In embodiments, this information may be used to determine the images and/or colors of light to project onto the cat 304 by projectors (not shown, but may be similar to projectors 114a, 114b of FIG. 1) to cause the 304 to be obscured 304a and to blend into the area 312 surrounding the cat 304.

FIG. 3B, shows the obscured cat 304a, which may be similar to the obscured physical object 204a of FIG. 2C. As a result of the projection as described above, the cat 304a has been substantially obscured, but has not been rendered completely invisible. In addition, the process as described above may be repeated in real time, or near real time, so that when the cat 304 moves, attributes may be updated and projections modified to substantially maintain the appearance of the obscured cat 304a.

Figure 4:
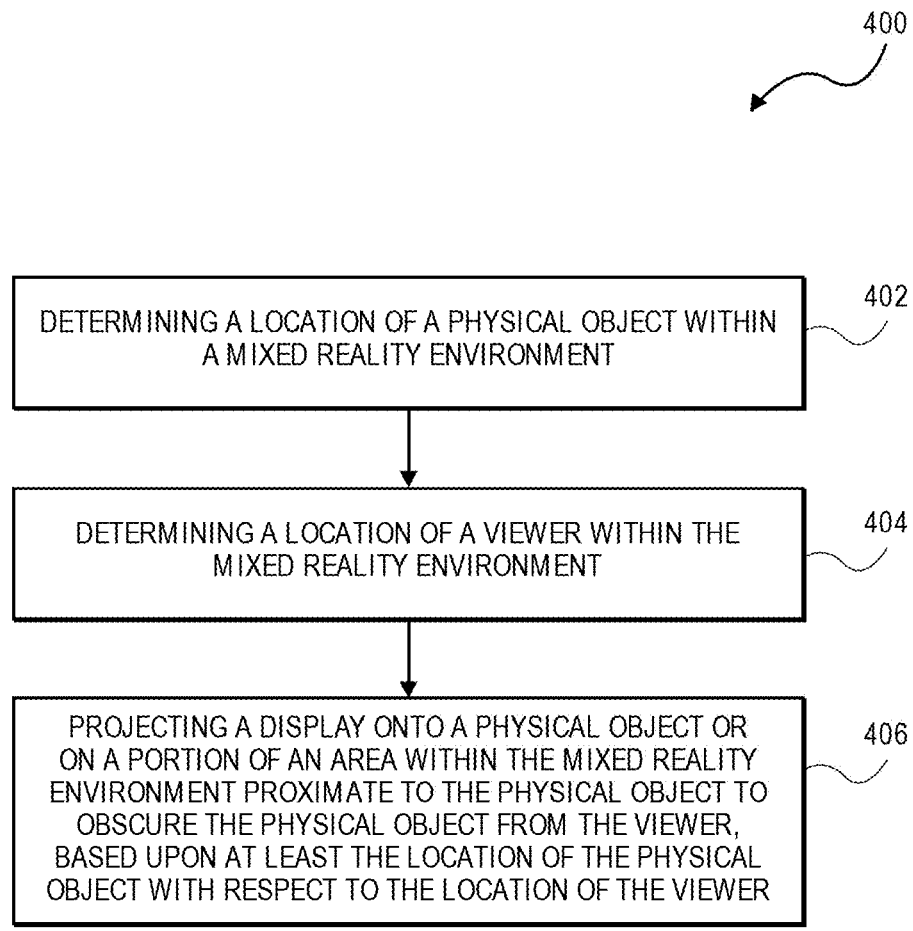
FIG. 4 illustrates an example process for implementing a location identifier system, in accordance with various embodiments.

FIG. 4 illustrates an example process for implementing a location identifier system, in accordance with various embodiments. The process 400 may be performed, for example, by a system 500 (e.g., computing device) configured to implement a mixed reality or AR system as described in reference to FIGS. 1-3B.

The process may begin at block 402 and may include determining a location of a physical object within a mixed reality environment. In embodiments, images from one or more cameras 110a, 110b may be used to identify a location of a physical object, such as physical object 104 within a mixed reality environment 100 of FIG. 1. In embodiments, other detection processes may be used, for example sensors, signals from the physical object 104, or any other suitable location detection process. In embodiments, determining a location may also include determining movement, a movement path, and/or a movement pattern of the physical object 104 within three-dimensional space of the mixed reality environment 100.

In embodiments, determining the location may be used to identify, or to trigger, whether the physical object 104 is to transfer to a virtual object 108. This trigger may thereby the physical object 104 to be obscured as the virtual object 108 may become visible.

At block 404, the process may include determining a location of a viewer within the mixed reality environment. In embodiments, the viewer may be a user 102 of the mixed reality environment 100 of FIG. 1. In embodiments, images from one or more cameras 110*a*, 110*b* may be used to identify a location of the user 102. In embodiments, other detection processes may be used, for example sensors or signaling devices placed on or around the user 102, or any other suitable location detection process. In embodiments, the location of the user 102 may include determining movement of the user, a movement path, and/or a movement pattern within the three-dimensional space of the mixed reality environment 100. In addition, the location of the user 102 may also include a direction in which the user 102 may be looking.

At block 406, the process may include projecting a display onto the physical object or on a portion of an area within the mixed reality environment proximate to the physical object to obscure the physical object from the viewer, based upon at least the location of the physical object with respect to the location of the viewer. In embodiments, information about the location of the physical object 104 and the location of the viewer, which may be the user 102 of FIG. 1, may be used to identify one or more images to display onto the physical object 104 to cause the physical object 104 to be obscured.

In embodiments, this process may also include determining attributes of a plurality of regions on the physical object 104, and determining attributes of a plurality of regions on a portion of the mixed reality environment process to the physical object, which may be similar to area 112 of FIG. 1. Based upon the determined attributes, projectors, such as projectors 114*a*, 114*b* when projecting onto the physical object 104, may include modifying lighting that is projected onto the physical object or regions on the physical object based upon the attributes of the region on the physical object, and the attributes of at least one of a plurality of regions on a portion of the area proximate to the physical object.

In embodiments, the lighting that may be projected upon the physical object may include visible light, ultraviolet light, polarized light, unpolarized light, or any other light suitable to change the appearance of a surface on which the light is projected.

In embodiments, obscuring may include partial obscuring. Since the attention of the user may be to follow the virtual object, any reduction of focus on the real object may facilitate the users experience of the physical object transferring to a virtual object. Likewise, an increase of focus on the real object may facilitate the user's experience of the virtual object transferring from a virtual world back to the physical object.

In embodiments where a more perfect obscuring is desired, physical objects may be selected for attributes that may be more projection friendly and therefore easier to obscure. For example, physical objects having surfaces with limited reflectance and limited texture may be better for showing a projection on the physical object to obscure it. In embodiments, ambient light may be adjusted to minimize reflection on the physical object. In embodiments, a physical object to be hidden, for example the cat 304 of FIG. 3A may include regions that are white and highlighted with projected light, making the hiding (including matching to the background) easier.

In addition, a texture of a region of a physical object may affect the effectiveness of projection to obscure the physical object. For example, a matte finish surface may be more easily obscured as compared to a glossy finish.

In other embodiments, learning systems may be used to identify, for a particular surface on a region of a physical object, or for a particular region within an area surrounding the physical object, different projections of light that may be more effective for obscuring that region of a physical object to a viewer.

In embodiments, the creation of a virtual object, such as virtual object 208 of FIG. 2 as the associated physical object, such as physical object 204*a*, is obscured may happen simultaneously or substantially simultaneously. For more details on the creation of a virtual object, please see U.S. Pat. No. 9,846,970, which is hereby incorporated by reference in full.

FIG. 5 illustrates an example computing device suitable for use to practice aspects of the present disclosure, in accordance with various embodiments. For example, the example computing device 500 may be suitable to implement the functionalities associated with FIGS. 1, 2A-2C, 3A-3B, and 4.

As shown, computing device 500 may include one or more processors 502, each having one or more processor cores, and system memory 504. In embodiments, the one or more processors may be referred to as processor circuitry. The processor 502 may include any type of unicore or multi-core processors. Each processor core may include a central processing unit (CPU), and one or more level of caches. The processor 502 may be implemented as an integrated circuit. The computing device 500 may include mass storage devices 506 (such as diskette, hard drive, volatile memory (e.g., dynamic random access memory (DRAM)), compact disc read only memory (CD-ROM), digital versatile disk (DVD) and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 500 may further include input/output (I/O) devices 508 such as a display, keyboard, cursor control, remote control, gaming controller, image capture device, or one or more cameras or one or more projectors, and so forth, and communication interfaces 510 (such as network interface cards, modems, infrared receivers, radio receivers (e.g., Bluetooth), and so forth). I/O devices 508 may be suitable for communicative connections with AR systems, other mixed reality systems, and the like. In some embodiments, I/O devices 508 when used as user devices may include a device necessary for identifying when a physical item is to transfer to a virtual representation or vice versa in relation to FIGS. 1-4.

The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing the operations and functionalities associated with some of the components of FIGS. 1-4. and so forth, generally shown as computational logic 522. Computational logic 522 may be implemented by assembler instructions supported by processor(s) 802 or high-level languages that may be compiled into such instructions.

System memory 504 and/or mass storage devices 506, may also include data such as data associating various lighting schemes to patterns of regions on a physical object and or an area proximate to the physical object with respect to FIGS. 1-4.

The computational logic 522 may contain one or more modules 550, which may perform one or more functions associated with FIGS. 1-4. In embodiments, when implementing an object obscuring module, module 550 may perform one or more of the functions associated with process 400 of FIG. 4.

The permanent copy of the programming instructions may be placed into mass storage devices 506 in the factory, or in the field, though, for example, a distribution medium (not shown), such as a compact disc (CD), or through communication interfaces 510 (from a distribution server (not shown)).

Figure 6:
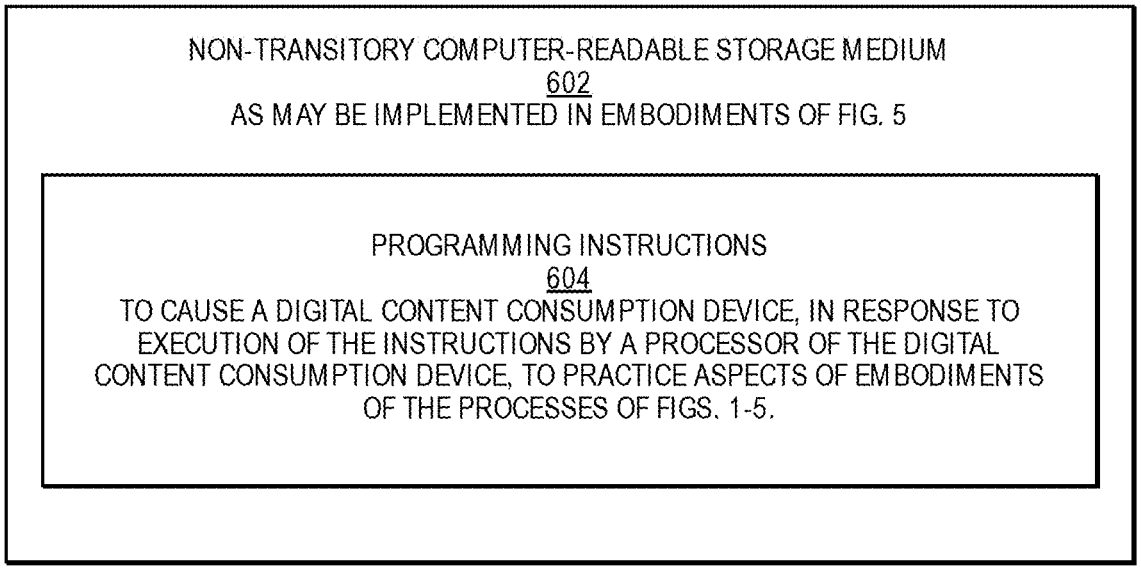
FIG. 6 illustrates an example non-transitory computer-readable storage medium having instructions configured to practice all or selected ones of the operations associated with the processes described herein.

FIG. 6 illustrates an example non-transitory computer-readable storage medium having instructions configured to practice all or selected ones of the operations associated with the processes described herein. As illustrated, non-transitory computer-readable storage medium 602 may include a number of programming instructions 604 (e.g., including a controller module and logic blocks). Programming instructions 604 may be configured to enable a device, e.g. computing device 500, in response to execution of the programming instructions, to perform one or more operations of the processes described in reference to FIGS. 1-4. In alternate embodiments, programming instructions 604 may be disposed on multiple non-transitory computer-readable storage media 602 instead. In still other embodiments, programming instructions 604 may be encoded in transitory computer-readable signals.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be one or more computer-readable media comprising instructions that cause a computer device, in response to execution of the instructions by one or more processors of the computer device, to operate an object obscuring engine to: determine a location of a physical object within a mixed reality environment; determine a location of a viewer within the mixed reality environment; and project a display onto the physical object or on a portion of an area within the mixed reality environment proximate to the physical object to obscure the physical object from the viewer, based upon at least the location of the physical object with respect to the location of the viewer.

Example 2 may include the one or more computer-readable media of example 1, wherein the object obscuring engine is to further: determine attributes, respectively, of a plurality of regions on the physical object; determine attributes, respectively, of a plurality of regions of a portion of the mixed reality environment proximate to the physical object; and wherein projection of a display onto the physical object includes modification of lighting projected onto the physical object, based further upon the determined respective attributes of at least one of the plurality of regions on the physical object or the determined respective attributes of at least one of the plurality of regions of the portion of the area within the mixed reality environment proximate to the physical object.

Example 3 may include the one or more computer-readable media of example 2, wherein modification of lighting on the physical object further includes: cause to project, by a light source within the mixed reality environment, one or more types of light onto at least one or more of the plurality of regions on the physical object or at least one or more of the plurality of regions of the portion of the area within the mixed reality environment proximate to the physical object.

Example 4 may include the one or more computer-readable media of example 3, wherein the type of light includes a color of the light or an intensity of the light.

Example 5 may include the one or more computer-readable media of example 2, wherein the attributes, respectively, of the plurality of regions of the portion of the mixed reality environment include at least one of color, surface texture, or orientation with respect to the location of the viewer.

Example 6 may include the one or more computer-readable media of example 2, wherein the attributes respectively of the plurality of regions of the object include at least one of color, surface texture, or orientation with respect to the location of the viewer.

Example 7 may include the one or more computer-readable media of example 1, the object obscuring engine is to further identify a triggering event, wherein the triggering event is an indication to obscure the physical object from the viewer.

Example 8 may include the one or more computer-readable media of example 7, wherein the computer device is further caused to operate an augmented reality (AR) system, the AR system including the object obscuring engine; and wherein the triggering event is based upon an interaction of the AR system with the physical object.

Example 9 may include the one or more computer-readable media of example 1, wherein the viewer is a selected one of a human or a camera.

Example 10 may include the one or more computer-readable media of example 1, wherein the viewer is a first viewer; wherein the object obscuring engine is to further determine a location of a second viewer within the mixed reality environment; and wherein projection of a display onto the physical object or on a portion of an area within the mixed reality environment proximate to the physical object to obscure the physical object from the viewer, is further based upon at least the location of the second viewer.

Example 11 may be an apparatus to obscure a physical object, the apparatus comprising: one or more computer processors an object obscuring module communicatively coupled to the one or more processors to: determine a location of a physical object within a mixed reality environment; determine a location of a viewer within the mixed reality environment; and project a display onto the physical object or on a portion of an area within the mixed reality environment proximate to the physical object to obscure the physical object from the viewer, based upon at least the location of the physical object with respect to the location of the viewer.

Example 12 may be the apparatus of example 11, wherein the object obscuring engine is to further: determine attributes, respectively, of a plurality of regions on the physical object; determine attributes, respectively, of a plurality of regions of a portion of the mixed reality environment proximate to the physical object; and wherein projection of a display onto the physical object includes modification of lighting projected onto the physical object, based further upon the determined respective attributes of at least one of the plurality of regions on the physical object or the determined respective attributes of at least one of the plurality of regions of the portion of the area within the mixed reality environment proximate to the physical object.

Example 13 may include the apparatus of example 12, wherein modification of lighting on the physical object further includes: cause to project, by a light source within the mixed reality environment, one or more types of light onto at least one or more of the plurality of regions on the physical object or at least one or more of the plurality of regions of the portion of the area within the mixed reality environment proximate to the physical object.

Example 14 may include the apparatus of example 13, wherein the type of light includes a color of the light or an intensity of the light.

Example 15 may include the apparatus of example 12, wherein the attributes, respectively, of the plurality of regions of the portion of the mixed reality environment include at least one of color, surface texture, or orientation with respect to the location of the viewer.

Example 16 may be a method comprising: determining a location of a physical object within a mixed reality environment; determining a location of a viewer within the mixed reality environment; and projecting a display onto the physical object or on a portion of an area within the mixed reality environment proximate to the physical object to obscure the physical object from the viewer, based upon at least the location of the physical object with respect to the location of the viewer.

Example 17 may include the method of example 16, further comprising: determining attributes, respectively, of a plurality of regions on the physical object; determining attributes, respectively, of a plurality of regions of a portion of the mixed reality environment proximate to the physical object; and wherein projecting a display onto the physical object includes modifying lighting projected onto the physical object, based further upon the determined respective attributes of at least one of the plurality of regions on the physical object or the determined respective attributes of at least one of the plurality of regions of the portion of the area within the mixed reality environment proximate to the physical object.

Example 18 may include the method of example 17, wherein the attributes respectively of the plurality of regions of the object include at least one of color, surface texture, or orientation with respect to the location of the viewer.

Example 19 may include the method of example 16, further comprising identifying a triggering event, wherein the triggering event is an indication to obscure the physical object from the viewer.

Example 20 may include the method of example 19, wherein identifying the triggering event is based upon an interaction of an augmented reality (AR) system with the physical object.

What is claimed is:

1. One or more non-transitory computer-readable media comprising instructions that cause a computer device, in response to execution of the instructions by one or more processors of the computer device, to operate an object obscuring engine to:
   determine a location of a physical object within a mixed reality environment;
   determine a location of a viewer within the mixed reality environment;
   determine attributes of a snippet area of the mixed reality environment proximately surrounding the physical object, the snippet area being of a size sufficiently larger than a size of the physical object to surround the physical object; and
   project a display onto the physical object, based upon at least the location of the physical object with respect to the location of the viewer, and the attributes of the snippet area of the mixed reality environment surrounding the physical object, to obscure the physical object from the viewer.

2. The one or more non-transitory computer-readable media of claim 1, wherein the object obscuring engine is to further:
   determine attributes, respectively, of a plurality of regions on the physical object;
   wherein projection of a display onto the physical object further includes modification of lighting projected onto the physical object, based upon at least the location of the physical object with respect to the location of the viewer, the attributes of the snippet area of the mixed reality environment surrounding the physical object, and the determined respective attributes of at least one of the plurality of regions on the physical object.

3. The one or more non-transitory computer-readable media of claim 2, wherein modification of lighting on the physical object further includes:
   cause to project, by a light source within the mixed reality environment, one or more types of light onto at least one or more of the plurality of regions on the physical object.

4. The one or more non-transitory computer-readable media of claim 3, wherein the type of light includes a color of the light or an intensity of the light.

5. The one or more non-transitory computer-readable media of claim 2, wherein the attributes of the snippet area of the mixed reality environment surrounding the physical object include at least one of color, surface texture, or orientation with respect to the location of the viewer.

6. The one or more non-transitory computer-readable media of claim 2, wherein the attributes respectively of the plurality of regions of the object include at least one of color, surface texture, or orientation with respect to the location of the viewer.

7. The one or more non-transitory computer-readable media of claim 1, the object obscuring engine is to further identify a triggering event, wherein the triggering event is an indication to obscure the physical object from the viewer.

8. The one or more non-transitory computer-readable media of claim 7, wherein the computer device is further caused to operate an augmented reality (AR) system, the AR system including the object obscuring engine; and wherein the triggering event is based upon an interaction of the AR system with the physical object.

9. The one or more non-transitory computer-readable media of claim 1, wherein the viewer is a selected one of a human or a camera.

10. The one or more non-transitory computer-readable media of claim 1, wherein the viewer is a first viewer; wherein the object obscuring engine is to further determine a location of a second viewer within the mixed reality environment; and wherein projection of a display onto the physical object to obscure the physical object from the viewer is further based upon at least the location of the second viewer.

11. The one or more non-transitory computer-readable media of claim 1, wherein the computer device is further caused to project another display onto the snippet area of the mixed reality environment surrounding the physical object, based upon at least the location of the physical object with respect to the location of the viewer, and the attributes of the snippet area of the mixed reality environment surrounding the physical object, to contribute to obscure the physical object from the viewer.

12. The one or more non-transitory computer-readable media of claim 11, wherein the computer device is further caused to project the other display onto the snippet area of the mixed reality environment surrounding the physical object, based further upon attributes, respectively, of a plurality of regions on the physical object.

13. An apparatus to obscure a physical object, the apparatus comprising:
one or more computer processors and an object obscuring module communicatively coupled to the one or more processors to:
determine a location of a physical object within a mixed reality environment;
determine a location of a viewer within the mixed reality environment;
determine attributes of a snippet area of the mixed reality environment surrounding the physical object, the snippet area being of a size sufficiently larger than a size of the physical object to surround the physical object; and
cause to project a display onto the physical object, based upon at least the location of the physical object with respect to the location of the viewer, and the attributes of the snippet area of the mixed reality environment surrounding the physical object, to obscure the physical object from the viewer.

14. The apparatus of claim 13, wherein the object obscuring module is to further:
determine attributes, respectively, of a plurality of regions on the physical object;
wherein projection of a display onto the physical object includes modification of lighting projected onto the physical object, based upon at least the location of the physical object with respect to the location of the viewer, the attributes of the snippet area of the mixed reality environment surrounding the physical object, and the determined respective attributes of at least one of the plurality of regions on the physical object.

15. The apparatus of claim 14, wherein modification of lighting on the physical object further includes:
cause to project, by a light source within the mixed reality environment, one or more types of light onto at least one or more of the plurality of regions on the physical object.

16. The apparatus of claim 15, wherein the type of light includes a color of the light or an intensity of the light.

17. The apparatus of claim 14, wherein the attributes of the snippet area of the mixed reality environment surrounding the physical object include at least one of color, surface texture, or orientation with respect to the location of the viewer.

18. The apparatus of claim 13, wherein the one or more computer processors and an object obscuring module are to further cause to project another display onto the snippet area of the mixed reality environment surrounding the physical object, based upon at least the location of the physical object with respect to the location of the viewer, and the attributes of the snippet area of the mixed reality environment surrounding the physical object, to contribute to obscure the physical object from the viewer.

19. The apparatus of claim 18, wherein the one or more computer processors and an object obscuring module are to further cause to project the other display onto the snippet area of the mixed reality environment surrounding the physical object, based further upon attributes, respectively, of a plurality of regions on the physical object.

20. A method comprising:
determining a location of a physical object within a mixed reality environment;
determining a location of a viewer within the mixed reality environment;
determining attributes of a snippet area of the mixed reality environment surrounding the physical object of a size sufficiently larger than a size of the physical object to surround the physical object; and
projecting a display onto the physical object, based upon at least the location of the physical object with respect to the location of the viewer, and the attributes of the snippet area of the mixed reality environment surrounding the physical object, to obscure the physical object from the viewer.

21. The method of claim 20, further comprising:
determining attributes, respectively, of a plurality of regions on the physical object;
wherein projecting a display onto the physical object includes modifying lighting projected onto the physical object, based upon at least the location of the physical object with respect to the location of the viewer, the attributes of the snippet area of the mixed reality environment surrounding the physical object, and the determined respective attributes of at least one of the plurality of regions on the physical object.

22. The method of claim 21, wherein the attributes respectively of the plurality of regions of the object include at least one of color, surface texture, or orientation with respect to the location of the viewer.

23. The method of claim 20, further comprising identifying a triggering event, wherein the triggering event is an indication to obscure the physical object from the viewer.

24. The method of claim 23, wherein identifying the triggering event is based upon an interaction of an augmented reality (AR) system with the physical object.

* * * * *